United States Patent [19]

Higgins

[11] 4,059,459

[45] Nov. 22, 1977

[54] LEAD CHROMATE PIGMENT WITH IMPROVED THERMAL STABILITY

[75] Inventor: James Francis Higgins, Livingston, N.J.

[73] Assignee: E. I. Du Pont de Nemours and Company, Wilmington, Del.

[21] Appl. No.: 730,518

[22] Filed: Oct. 7, 1976

Related U.S. Application Data

[63] Continuation-in-part of Ser. No. 561,436, March 24, 1975, abandoned.

[51] Int. Cl.² ............................ C09C 1/20; C09C 3/06
[52] U.S. Cl. ............................ 106/298; 106/308 B; 427/215
[58] Field of Search ..................... 106/298, 308 B; 427/215

[56] References Cited

U.S. PATENT DOCUMENTS

| | | | |
|---|---|---|---|
| 2,030,009 | 2/1936 | Lederle | 106/298 |
| 2,365,171 | 12/1944 | Botti | 106/298 |
| 3,370,971 | 2/1968 | Linton | 106/298 |

*Primary Examiner*—Patrick P. Garvin
*Assistant Examiner*—William G. Wright

[57] ABSTRACT

Dense silica-coated lead chromate pigment prepared by adding from 0.2% to 1% by weight of a soluble silicate compound to an aqueous solution of chromate, and, optionally, at least one of sulfate and molybdate, contacting the aqueous solution with an aqueous lead salt to precipitate the base lead chromate pigment, treating the pigment with at least one hydrous oxide, and applying from 2% to 40% by weight of dense, amorphous silica to the treated lead chromate pigment. The resulting dense silica-coated lead chromate pigment exhibits higher thermal stability in plastics than conventional dense silica-coated lead chromate pigment.

5 Claims, No Drawings

LEAD CHROMATE PIGMENT WITH IMPROVED THERMAL STABILITY

CROSS REFERENCE TO RELATED APPLICATION

This application is a continuation-in-part of my copending application Ser. No. 561,436, filed March 24, 1975 now abandoned.

BACKGROUND OF THE INVENTION

The term "lead chromate pigment" as used herein refers to the pigments identified as Chrome Yellow CI-77600 Lead Sulfochromate CI-77603, and Molybdate Orange CI-77605 in the "Colour Index", second edition, 1956, published jointly by the Society of Dyers and Colourists, England, and the American Association of Textile Chemists and Colorists, United States. The yellow lead chromate pigments include a very green shade "Primrose Yellow" in rhombic crystal form, a relatively pure lead chromate in monoclinic crystal form commonly known as "Medium Yellow" and solid solutions of lead chromate and lead sulfate in monoclinic form known as "Light Yellows". The molybdate oranges vary in color from a relatively light masstone, strong and yellow tint (small particle size) to a dark, red masstone and weak, red tint (relatively large particle size).

Lead chromate pigments have been prepared by a variety of methods, most of which involve precipitation of the lead chromate pigment from aqueous solutions of its constituent ions, i.e., lead, chromate, sulfate and for molybdate oranges, molybdate, in amounts varying according to the shade of pigment desired. Conventionally, an aqueous solution containing the soluble anionic salts is mixed with a lead salt, in the form of an aqueous slurry or an aqueous solution, depending on the solubility of the lead salt. After precipitation, but prior to isolation, the lead chromate pigment is commonly treated with a variety of hydrous oxides among which are hydrous oxides of aluminum, titanium, manganese, silicon, antimony and bismuth or mixtures thereof to provide a loose porous coating on the surface of the pigment to enhance pigmentary properties, such as lightfastness in paint compositions, as described, for example, in U.S. Pat. Nos. 2,212,917, 2,808,339, and 2,813,039. The red shade molybdate orange pigments are conventionally further treated with an antimony compound, commonly antimony trichloride, prior to isolation.

The major contribution toward color of lead chromate pigment resides in the lead chromate component. Likewise, many of their shortcomings are also attributable to the properties inherent in the lead chromate component. Among these are (1) sensitivity to alkalies and acids, (2) staining in the presence of sulfides and (3) darkening on exposure to light or to elevated temperatures.

Early attempts to overcome these deficiencies have usually involved special treatment of the pigments designed either to provide a means of neutralizing the attacking agent and rendering it temporarily ineffective or to provide a barrier against the ready access thereof to the sensitive pigment particle. The claimed improvements, although very frequently demonstrable, have usually been only of academic interest in that their effectiveness has been short lived and not of sufficient duration to render possible the use of these pigments in many applications, particularly those applications where a high degree of thermal stability is required.

More recent and relatively successful attempts to overcome these deficiencies are described, for example, in U.S. Pat. Nos. 3,370,971 and 3,639,133. These patents describe coated lead chromate pigments, which are chemically resistant, lightfast and relatively thermally stable. The pigments therein described are prepared by applying a coating of dense, amorphous silica and optionally alumina to lead chromate pigment which has been precipitated and after-treated with hydrous oxide in a conventional manner. The dense silica-coated lead chromate pigments are described generally as resistant to darkening when heated to 300° C. to 320° C. in such plastics as polyethylene or polystyrene. A dense silica-coated molybdate orange pigment is described in Example 1 of U.S. Pat. No. 3,370,391 as exhibiting no significant discoloration up to about 250° C. and minor discoloration up to 315° C. in a thermoplastic resin, compared to a conventional molybdate orange which darkens noticeably at 230° C. A dense silica-coated Medium Chrome yellow is described in Example 7 of that patent as showing only small color loss at 288° C. as compared to a conventional medium chrome yellow.

Although the above-described silica-coated lead chromate pigments do show significant improvement in thermal stability when compared with uncoated pigment and gel-coated pigment known in the art, the resistance to darkening exhibited by these pigments at 300° C.–320° C. is low enough under many processing conditions to necessitate the use of temperatures from 20° C.–50° C. lower than the stated range to insure adequate color integrity. The resistance to darkening is further decreased in proportion to the length of time the pigment is exposed to elevated temperatures. For example, a pigment which retains color integrity when initially reaching an elevated temperature can darken considerably after being maintained at that temperature for several minutes.

The need to avoid elevated temperatures and extended exposure to elevated temperatures has a particularly adverse impact on the thermoplastics industry. In the thermoplastics industry pigmented thermoplastics are often held at the extrusion temperature for as long as 30 minutes prior to extrusion, during which time the pigment can significantly darken. In addition, the speed of further processing depends primarily on high temperature of the thermoplastic. In the processing of thermoplastics the use of temperatures even 20° C. below 300° C., not to mention 50° C. below, can decrease polymer flow and increase residence time of the polymer in the mold to the extent that process efficiency suffers and overall productivity decreases.

This invention provides for dense silica-coated lead chromate pigment which retains a significantly higher degree of color integrity at high temperatures than conventional dense silica-coated lead chromate pigments, while retaining and, in some cases surpassing, the degree of chemical resistance and lightfastness exhibited by the conventional dense silica-coated lead chromate pigments.

SUMMARY OF THE INVENTION

According to the invention there is provided a dense silica-coated lead chromate pigment prepared by the steps of i. adding from 0.2% to 1% by weight, and preferably from 0.3% to 0.5% by weight, of a soluble silicate compound, calculated as $SiO_2$ and based on the weight of the base lead chromate pigment, to an aqueous solution of a soluble salt of chromate and, optionally, at least one soluble salt selected from the group consisting of sulfate and molybdate, ii. contacting the aqueous solution of step (i) with an aqueous lead salt to precipitate the base lead chromate pigment, iii. treating the base lead chromate pigment with at least one hydrous metal oxide, preferably in a total amount from 0.5% to 6.0% by weight, calculated as the metal oxide and based on the weight of the treated lead chromate pigment, and iv. applying a coating of dense, amorphous silica to the treated lead chromate pigment of step (iii) in an amount from 2% to 40% by weight, calculated as $SiO_2$ and based on the weight of the dense silica-coated lead chromate pigment.

The term "base lead chromate pigment" as used herein refers to lead chromate pigment resulting from the reaction of the lead component with the chromate component, and, optionally, molybdate or sulfate components, prior to the treatment with hydrous metal oxide and the application of the dense silica coating. The silicate compound utilized in this process is desirably an inorganic silicate of at least moderate solubility in water, such as alkali metal silicates.

The dense silica-coated lead chromate pigment of the invention is prepared in the same manner as the dense silica-coated lead chromate pigment described in U.S. Pat. No. 3,370,971, except that from 0.2% to 1.0% of a silicate compound is added to the aqueous solution of anions prior to the precipitation of the pigment by the addition of an aqueous lead salt. The dense silica-coated lead chromate pigment of the invention is distinguished from the pigment of the art in that when incorporated in plastics the pigment of the invention exhibits thermal stability at temperatures from 20° C. to 50° C. higher than the pigment of the art. Thermal stability is evidenced by the absence of darkening or discoloration of the pigmented plastic at elevated temperatures.

DETAILED DESCRIPTION OF THE INVENTION

The silicate compound utilized in the preparation of the pigment of the invention can be added to the aqueous solution from which the pigment is precipitated in the form of an aqueous solution of the silicate compound. A variety of silicate compounds are useful in this process, e.g., alkali metal silicates. The major criterion for the silicate compound is at least moderate water-solubility. It is essential that the silicate compound be added to the aqueous medium via the aqueous solution containing the predetermined proportions of chromate, sulfate, and molybdate prior to precipitation of the pigment. This procedure is not to be confused with conventional after-treatments with silica or other hydrous oxides, as described in step (iii), which involve the treatment of the pigment with hydrous oxide by addition of hydrolyzable salts of hydrous oxides to the aqueous medium after precipitation of the piment.

The aqueous solution from which lead chromate pigment is precipitated should contain a salt of chromate and, optionally, at least one salt of sulfate and molybdate which are at least moderately soluble and preferably highly soluble in aqueous solution. The relative proportions of the salts used depend on the shade of lead chromate pigment desired and are well-known to those skilled in the art. For example, a medium yellow shade usually requires from 97% to 100% lead chromate and a primrose shade usually requires from 40% to 85% by weight of lead chromate and 15% to 60% by weight of lead sulfate. For reasons of high solubility, economy and availability alkali metal salts, particularly sodium salts, of chromate, sulfate and molybdate are preferred. Aqueous lead salt is commonly mixed with the aqueous solution in the form of an aqueous slurry or aqueous solution depending on the solubility of the lead salt or salts used. A commonly used insoluble lead salt is lead carbonate, often prepared just prior to reaction with chromate, sulfate and molybdate by adding sodium carbonate to an aqueous solution of lead nitrate. Among the soluble lead salts useful in forming lead chromate pigment are lead nitrate and lead acetate.

Because of the extremely low solubility of lead chromate pigment in aqueous media, the pigment precipitates very rapidly from a solution of its constituent ions. Therefore, to have maximum control of the precipitation reaction, it is desirable to mix an aqueous solution of chromate and, optionally, at least one of sulfate and molybdate with a separate aqueous solution or slurry of lead salt. In the preparation of lead chromate pigment of the medium yellow type, the total chromate should be added to the aqueous medium in two parts. That is, a first aqueous solution containing the desired amount of silicate and sulfate and from about 70% to 95% of the predetermined amount of chromate is first contacted with an aqueous solution of lead salt to initially precipitate the pigment, then, a solution containing the remaining chromate is added to the pigment slurry. For all precipitations it is preferred that the mixing be done under conditions which promote rapid intimate contact of the salt solutions.

After addition of the silicate compound followed by precipitation of the pigment, it is essential that the pigment receive the conventional after-treatments with at least one hydrous metal oxide and preferably at least two hydrous metal oxides in order to achieve improved properties in the final pigment. No significant improvement in the properties of lead chromate pigment is observed when the silicate compound is employed alone, i.e., without application of at least one hydrous metal oxide after precipitation of the base lead chromate pigment. Among the hydrous metal oxides useful in the practice of the invention are hydrous metal oxides of aluminum, titanium, manganese, silicon, tin, hafnium, thorium, columbium, tantalum, antimony, bismuth and mixtures thereof. When more than one hydrous metal oxide is applied to the pigment it is preferred that hydrous alumium oxide be one of the hydrous metal oxides chosen to insure the most significant improvement in the properties of the silica-treated pigment. The second oxide of choice preferred for use with hydrous aluminum oxide is hydrous titanium oxide for lead chromate pigment of the chrome yellow type and hydrous silicon dioxide for those of the molybdate orange type.

The total amount of hydrous metal oxide or oxides applied after precipitation of the pigment is preferably from 0.5% to 6.0% by weight, calculated as metal oxide and based on the weight of the treated lead chromate pigment. For treated lead chromate pigment of the yellow types, i.e., light and medium, it is preferred that the pigment contain from 1.0% to 2.0% by weight of hydrous titanium oxide and from 1.0% to 2.0% by weight of hydrous aluminum oxide, in addition to 0.2% to 1%, and preferably 0.3% to 0.5%, by weight of silica.

For treated lead chromate pigment of the molybdate orange type, it is preferred that the pigment contain from 1.0% to 1.5% of hydrous aluminum oxide and from 1% to 5% hydrous antimony oxide in addition to the silica. For treated lead chromate pigment of the primrose type, it is preferred that the pigment contain from 1% to 2% by weight of hydrous aluminum oxide and from 1% to 2% of hydrous manganous oxide in addition to the silica.

The after-treatment with hydrous metal oxide which follows precipitation of the lead chromate pigment can be applied in the conventional manner well-known to those skilled in the art, e.g., U.S. Pat. Nos. 2,212,917 and 2,808,339. The hydrous metal oxides can be applied to the pigment by adding water-soluble inorganic metal salts capable of forming the corresponding hydrous metal oxides in water to the aqueous slurry of pigment. Among the water-soluble inorganic metal salts used are metal halides such as aluminum chloride and hydrated metal sulfate such as hydrated aluminum sulfate, titanyl sulfate and manganese sulfate.

The procedures for applying a coating of dense, amorphous silica to the surface of the treated lead chromate pigment are well known in the art. The commonly used, practical procedures for applying a dense silica coating to a pigment involve using pigment which has been isolated from the aqueous slurry in which is was precipitated. The isolation procedure conventionally involves filtration, washing and, optionally, drying. For the lead chromate pigment prepared according to the invention, isolation prior to dense silica coating is preferred to achieve pigment having the highest thermal stability in plastics. The dense silica coating is preferably applied to the treated pigment in an amount from 2% to 40% by weight, based on the total weight of the dense silica-coated pigment, by a variety of conventional methods, such as described in U.S. Pat. Nos. 3,370,971 and 3,639,133.

In one method a dilute sodium silicate solution (about 3% by weight of $SiO_2$) is passed through a bed of cation exchange resin in the hydrogen form of sufficient capacity so that all of the sodium ion is removed to give a silicic acid effluent with a pH of 2.9–3.3. Such a solution is only moderately stable, but will keep for several hours without gelation if maintained at a low temperature (close to 0° C.). A suitable amount of such a silicic acid solution is then added slowly (3–5 hours) to the alkaline pigment slurry at 90°–95° C. while maintaining the pH in the range of 9.0–9.5 by the periodic addition of increments of a dilute alkali such as NaOH solution. Obviously, the exact method of maintaining the pH in the desired range is not important and it could be done by maintaining the presence of a suitable buffer. Such a method would be subject, however, to the limitations imposed by the presence of sodium ion or other metallic ions, and the simple periodic addition of a suitable alkali has many points in its favor.

In another method equivalent amounts of a dilute sodium silicate solution (5.7% $SiO_2$) and a dilute sulfuric acid solution (3.18% $H_2SO_4$) are added simultaneously to the hot (±95° C.) alkaline pigment slurry over a substantial period of time (3–5 hours) while maintaining the pH in the range of 9.0–10.0 by periodic addition of small amounts of dilute alkali (NaOH solution for instance). This is the preferred method of operation, and the variations mentioned earlier may easily be applied thereto. Thus, the pH may be allowed to go below 9.0, perhaps as low as 6.0 to 7.0, without completely destroying the desired effect; nevertheless, the results are better in the higher range. The reaction time can be reduced to as little as one hour without serious detriment. Altough the temperature of reaction may be as low as about 60° C., this causes some tendency toward the formation of free $SiO_2$ in gel form; hence it is highly desirable to keep the temperature above at least 75° C. The exact concentrations of the solutions used are not important except that they should be relatively dilute and the amounts used should be essentially chemically equivalent.

A third method for applying a dense, amorphous silica coating to pigment involves adding all of the sodium silicate solution to the pigment slurry previously made alkaline, as with $NH_4OH$. This gives a pH of about 11.0, near the maximum permissible and, after heating the mixture to about 75° C., a 5% sulfuric acid solution is added slowly (1 to 1.5 hours) to give a final pH of about 7.8 to 8.0. An additional heating period up to about one hour is desirable in this procedure. The concentrations used and time of addition are not critical.

In each of these methods, the dense silica-coated product can be highly dispersed and difficult to filter with a considerable tendency for yield loss during the filtration and a tendency to result in hard products on drying. It is preferable, therefore, that a flocculation step be introduced. Such a step, although not necessary to the preparation of pigments of the desired characteristics, offers many advantages such as improved ease of filtration and washing, elimination of yield losses during filtration and improved texture of the resulting pigment. A variety of methods known in the art, such as those described in U.S. Pat. No. 3,370,971 are useful in isolating the dense silica-coated pigment of this invention. A preferred method for facilitating isolation of the product is to add a polyvalent metal salt, especially an aluminum salt such as sodium aluminate, in aqueous solution, to the slurry of dense silica-coated pigment prior to isolation.

To overcome any fragility which may be exhibited by the encapsulating coatings discussed above, the coated pigment may, if desired, be treated with an alkaline earth metal salt of an acid selected from the group consisting of resin acids and long-chain fatty acids according to the procedure described in U.S. Pat. No. 3,470,007. This aftertreatment may render the coatings less susceptible to destruction under severely abrasive conditions of subsequent processing in plastics applications.

These methods of forming the dense amorphous silica layer on the surface of the lead chromate pigment particles have some feature in common, viz. that the silica is added as "active silica". When sodium silicate is acidified, silicic acid is formed, probably initially as orthosilicic acid, $Si(OH)_4$. However, this product tends to polymerize the reaction of two silanol groups

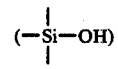

to form a siloxane group

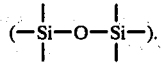

Under acidic conditions, this polymerization proceeds rapidly until a predominant proportion of the silanol groups present have been used up in the formation of siloxane bonds. The polymer thus formed has a high molecular weight and is defined as "inactive". Under the conditions of moderate alkalinity used in the examples below, there is a low degree of polymerization wherein the condensation between silanol groups has proceeded to only a limited extent leaving the silica in an "active" form which readily deposits on the surface of the pigment particles present. It is not intended to imply that there is no polymerization nor that the process of polymerization is completely inhibited but, under the conditions specified the silica is in a state of low polymerization and, thus "active", for a sufficient time to bring about deposition in the dense, amorphous form on the surface of the pigment particles.

The quantity of silica to be applied in the pigment coating can vary over a considerable range depending on the intended end use of the pigment. For use in extruded hot thermoplastic resins from 15 to 32% by weight of silica is desirable, and amounts up to about 40% by weight can be used without adversely affecting pigment color. In applications where extremely high thermal stability is not required, amounts of silica as low as 2% by weight provide improved chemical resistance and lightfastness. Thus, for purposes of this invention the dense, amorphous silica coating can be in the range of about 2% to 40% by weight of the final dense silica-coated pigment.

If desired the dense silica-coated lead chromate pigment of the invention, like the pigment of the art, can also have an outer coating of alumina to improve such properties as dispersibilty. The alumina is applied in the same manner as the after-treatment with hydrous metal oxides described hereinabove. When alumina is present the quantity of $Al_2O_3$ can be varied from 0.25% to 2% by weight of the final pigment.

It is not clear, at this time, exactly how the silicate compound added prior to the precipitation of the pigment effects the improvements in thermal stability of the dense silica-coated lead chromate pigment of the invention. While the role of the silicate compound is not fully understood, it is postulated that the silicate compound facilitates the application of porous hydrous oxide to the lead chromate pigment, which when coated with dense, amorphous silica exhibits much improved thermal stability.

The improvement in thermal stability exhibited by the dense silica-coated lead chromate pigments of the invention in various plastics is evidenced by the maintenance of color integrity at elevated temperatures. In other words, thermal stability is shown by an absence of darkening or discoloration of the pigmented plastic. Thermal stability in plastics is not a function of the pigment alone, but rather a function of the pigment in the particular plastic. Consequently, thermal stability in plastics is not a measure of the absolute heat stability of the isolated pigment but a measure of the thermal stability of the pigmented plastic. This is consistent with the art accepted measurement of thermal stability of pigment as described, for example, in U.S. Pat. No. 3,370,971.

While the dense silica-coated lead chromate pigments of the invention generally exhibit a degree of improvement in thermal stability ranging from 20° C. relative to conventional dense silica lead chromate pigments, the exact temperature at which the color of the pigmented plastic begins to degrade or darken will depend upon the temperature at which the plastic is used or extruded and upon the absolute thermal stability of the plastic alone. For example, plastics like ABS (acrylonitrile butadiene styrene) and PPO (polyphenylene oxide) darken considerably at use temperatures, i.e., 288° C. and 316° C., respectively, when unpigmented and pigments are often used at a higher than normal concentration to mask this discoloration.

In any event, over the range of maximum temperatures over which most plastics are used, i.e., 175° C. to 375° C., the dense silica-coated lead chromate pigments of the invention will maintain color integrity in plastic at temperatures from 20° C. to 50° C. higher than the conventional dense silica-coated lead chromate pigment prepared without the addition of the silica compound prior to precipitation of the pigment. Particular plastics in which the dense silica-coated lead chromate pigment of the invention may be used for improved thermal stability of the color include the following:

| Plastic Type | Maximum Temperature of Use |
|---|---|
| Low density polyethylene | 205° C.–232° C. |
| High density polyethylene | 316° C.–343° C. |
| Polypropylene | 316° C.–343° C. |
| ABS | 288° C. |
| Flexible polyvinylchloride | 177° C. |
| Rigid polyvinylchloride | 232° C. |
| PPO | 316° C. |
| Ionomer resin | 260° C. |
| Polycarbonates | 316° C.–343° C. |
| Polysulfones | 316° C.–343° C. |
| Nylon | 371° C. |
| Polyacetal | 232° C. |
| Cellulose acetate butyrate | 260° C. |
| Polystyrene | 330° C. |

The following examples are intended to illustrate the invention. The term "parts" as used herein refers to parts by weight. The physical and chemical properties of all exemplified pigments are determined according to the procedures described in Examples 1 and 2.

EXAMPLE 1

Silica-Treated Lead Chromate Pigment of the Light Yellow Type

Solution A is prepared by dissolving 441.64 parts of $Pb(NO_3)_2$ in 2400 parts of water at a temperature of 80° F. (27° C.) and the pH is adjusted to 3.2. Solution B is prepared by dissolving 139.15 parts of $Na_2Cr_2O_7.2H_2O$, 27.8 parts of $Na_2SO_4$, 3.07 parts of $NaHF_2$ and 4.92 parts of sodium silicate (29.5% of $SiO_2$, $SiO_2/Na_2O$ = 3.25, such as Du Pont Technical Grade No. 9) in 1520 parts of water and the pH is adjusted to 12.1–12.3 at a temperature of 80° F.(27° C.).

To precipitate the pigment, Solution B is added to Solution A over a period of about 40 seconds with agitation. The resulting slurry is heated to 165° F.(74° C.) in 3 minutes. Then the slurry is rapidly heated to 205° F. (96° C.) and maintained at that temperature for 10 minutes. Then an aqueous solution containing 30.5 parts of hydrated aluminum sulfate (equivalent to 56.1% $Al_2(SO_4)_2$ or 17.1% of $Al_2O_3$) is added to the slurry. After the slurry is stirred for five minutes, an aqueous solution of titanyl sulfate in an amount equivalent to 6.49 parts of titanium dioxide is added to the slurry with stirring. Ten seconds after the addition of titanyl sulfate is complete the slurry is neutralized with an aqueous solution of sodium carbonate. The resulting brilliant lead chromate pigment of light yellow shade is isolated from the slurry in the conventional manner by filtration, washing and drying. The product is analyzed and found to contain 0.31% by weight of $SiO_2$, based on the weight of the treated pigment.

For purposes of comparative testing, a conventional lead chromate pigment of the light yellow type is prepared in the identical manner, except for the omission of the sodium silicate in Solution B, i.e., in accordance with U.S. Pat. No. 3,370,971.

When the silica-treated light yellow pigment and the conventional light yellow pigment are separately dispersed in a conventional alkyd coating composition vehicle and panels coated with the resulting composition are exposed to light, a similar degree of lightfastness is observed. When similar panels are exposed to a 10% aqueous solution of sodium hydroxide and a 1% aqueous solution of sodium sulfide, respectively, the silica-treated light yellow pigment and the conventional light yellow pigment exhibit comparable resistance to spotting and color loss.

EXAMPLE 2

Dense Silica-Coated Lead Chromate Pigment of the Light Yellow Type

A paste is prepared by mixing 150 parts of the silica-treated pigment prepared according to the procedure of Example 1, 20 parts of the sodium silicate described in Example 1 and 447 parts of water. The mixture is further diluted with 790 parts of water for a total of about 1237 parts of water. The pH of the resulting slurry is then adjusted to 11.5 with a 5% aqueous solution of sodium hydroxide and the resulting pigment slurry is heated to 90° C.

In separate containers the following solutions are prepared:
1. 115 parts of the above-described sodium silicate is added to 530 parts of water,
2. 17.3 parts of 96.0% sulfuric acid is added to 800 parts of water.

These solutions are then added simultaneously to the pigment slurry prepared above over a period of three hours for solution (1) and 3¾ hours for solution (2), while maintaining the temperature at 90°–95° C. throughout the addition. After completion of the addition of solutions (1) and (2), an aqueous solution containing 10.0 parts of aluminum sulfate in 100 parts of water is added to the slurry. The slurry is stirred for five minutes and the pH is adjusted to 4.0–4.2 with 5% aqueous solution of sodium hydroxide. The product is then filtered, washed with water to a resistance of 5,000 ohms and dried overnight at 220° F. (104° C.) to give a silica-coated lead chromate pigment of the light yellow type having superior properties.

When tested for lightfastness and chemical resistance in the manner described in Example 1, the dense silica-coated light yellow pigment treated with silica shows comparable lightfastness and chemical resistance relative to a conventional dense silica-coated light yellow pigment prepared in the identical manner, except for the omission of sodium silicate in Solution B, i.e., in accordance with U.S. Pat. No. 3,370,971.

To test for resistance to darkening in thermophasic at high temperatures, the dense silica-coated light yellow pigment treated with silica and the conventional dense silica-coated light yellow pigment are separately mixed with solid granular polystyrene and subjected to can rolling for 10 minutes, according to the method described in U.S. Pat. No. 3,639,133, then two-roll milled (0.016 inch clearance) into sheets. The sheets are cut and placed in an extruder at temperatures ranging from 204° C. to about 320° C. Prior to extrusion, the hot polystyrene is maintained at temperature for 20 minutes. When the polystyrene is extruded, the polystyrene containing the dense silica-coated light yellow pigment treated with silica shows substantially no darkening at temperatures up to about 280° C. and only very slight darkening at 320° C. By comparison the polystyrene containing the conventional dense silica-coated light yellow pigment begins to darken at 278° C. and exhibits significant darkening at 320° C.

EXAMPLE 3

Silica-Treated Lead Chromate Pigment of the Medium Yellow TYPE

Solution A is prepared by dissolving 331.0 parts of $Pb(NO_3)_2$ in 1790 parts of water at 80° F. (27° C.) and the pH is adjusted to 3.3. Solution B is prepared by dissolving 145.5 parts of $Na_2Cr_2O_7.2H_2O$, 4.1 parts of $Na_2SO_4$, 0.385 parts of $NaHF_2$, and 5.25 parts of the sodium silicate described in Example 1 in 1790 parts of water at 80° F. (27° C.). Solution C is prepared by dissolving 4.5 parts of $Na_2Cr_2O_7.2H_2O$ in 100 parts of water.

Solution A is added to Solution B over a period of 40 seconds. Immediately thereafter Solution C is added to Solution B. The slurry is heated to 180° F. (82° C.) and maintained at that temperature for 20 minutes. Then an aqueous solution containing 48.0 parts of the hydrated aluminum sulfate described in Example 1 is added to the slurry. After one minute of stirring an aqueous solution of titanyl sulfate in an amount equivalent to 6.8 parts of titanium dioxide is added to the slurry. The slurry is stirred for 10 seconds after which an aqueous solution containing 34.0 parts of $Pb(NO_3)_2$ is added to the slurry. The pH of the slurry is then adjusted to 5.6 with $Na_2CO_3$. The resulting brilliant lead chromate pigment of medium yellow shade is isolated in the conventional manner by filtration, washing and drying. The product is analyzed and found to contain 0.41% by weight of $SiO_2$, based on the weight of the treated pigment.

The color and lightfastness of this medium yellow pigment are similar to those of a conventional medium yellow pigment, prepared in the identical manner except for the omission of the sodium silicate in Solution B, i.e., in accordance with U.S. Pat. No. 3,370,971. The chemical resistance of this medium yellow pigment is similar to that of the conventional medium yellow pigment comparably tested.

EXAMPLE 4

Dense Silica-Coated Lead Chromate Pigment of the Medium Yellow Type

The procedure of Example 2 is followed except that 150 parts of the silica-treated medium yellow pigment of Example 3 is used.

The color and lightfastness of this dense silica-coated medium yellow pigment are similar to those of a conventional dense silica-coated medium yellow pigment prepared in an identical manner except for the omission of the sodium silicate in Solution B, i.e., in accordance with U.S. Pat. No. 3,370,971. Chemical resistance of this dense silica-coated pigment is superior to that of the conventional dense silica-coated medium yellow pigment comparably tested. When tested for thermal stability in polystyrene as described in Example 2, this dense silica-coated pigment exhibited a degree of improvement in thermal stability relative to the conventional pigment comparable to the improvement specified in Example 2.

EXAMPLE 5

Silica-Treated Lead Chromate Pigment of the Molybdate Orange Type

Solution A is prepared by dissolving 386.2 parts of $Pb(NO_3)_2$ in 3160 parts of water and the pH is adjusted to 3.0–3.1 at a temperature of 67° F.–69° F. (19° C.–21° C.). Solution B is prepared by dissolving 139.5 parts of $Na_2Cr_2O_7.2H_2O$, 22.4 parts of $Na_2MoO_4$, 6.1 parts of $Na_2SO_4$ and 9.85 parts of the sodium silicate described in Example 1, in 3103 parts of water, and the pH is adjusted to 7.4–7.6 at a temperature of 67° F.–69° F. (19° C.–21° C.).

To precipitate the pigment, Solution B is introduced under the surface of Solution A over a period of 17–19 minutes with agitation. Chloride ion concentration is adjusted to develop tint and strength in the conventional manner by adding 57.0 parts of NaCl, after which the slurry is stirred for 15 minutes. To neutralize the slurry an aqueous solution containing 11.4 parts of $Na_2CO_3$ is then added to the slurry. Porous silica is then applied to the pigment by adding 18.3 parts of sodium silicate described in Example 1 and stirring for 3 minutes. Then an aqueous solution containing 28.5 parts of hydrated aluminum sulfate described in Example 1 is added to the slurry. The slurry is then neutralized by adding an aqueous solution containing 19.0 parts of sodium carbonate. After a few minutes of additional stirring, 7.0 parts of antimony oxide dissolved in hydrochloric acid is added to the slurry, after which the pH of the slurry is adjusted to 5.8–6.0. The resulting brilliant dark red shade molybdate orange pigment is isolated from the slurry in the conventional manner by filtration, washing and drying. The product contains 2.15% by weight of $SiO_2$ (including 1.4% by weight of $SiO_2$ applied as an aftertreatment), based on the weight of the treated pigment.

The color of this product is a darker red shade orange than that of a conventional molybdate orange pigment prepared in an identical manner except for the omission of the sodium silicate in Solution B. The chemical resistance is comparable to that of the conventional molybdate orange pigment and the lightfastness is superior to that of the conventional molybdate orange pigment.

EXAMPLE 6

Dense Silica-Coated Lead Chromate Pigment of the Molybdate Orange Type

The procedure of Example 2 is followed except that 150 parts of the silica-treated molybdate orange pigment of Example 5 is used.

The color of the resulting dense silica-coated molybdate orange pigment has a darker red shade than that of a conventional dense silica-coated molybdate orange pigment, prepared in an identical manner except for the omission of the sodium silicate in Solution B, i.e., in accordance with U.S. Pat. No. 3,370,971. The chemical resistance of the resulting pigment is superior to that of the conventional dense silica-coated molybdate orange pigment comparably tested. When tested for thermal stability in polystyrene as described in Example 2, this dense silica-coated pigment exhibited a degree of improvement in thermal stability relative to the conventional pigment comparable to the improvement specified in Example 2.

EXAMPLE 7

Silica-Treated Chrome Yellow Pigment of the Primrose Type

Solution A is prepared by dissolving 331.2 parts of $Pb(NO_3)_2$ in 2690 parts of water at 80° F. (27° C.) and the pH is adjusted to 4.1. An aqueous solution of 46.7 parts of $Na_2CO_3$ in 200 parts of water is added to solution A to form an aqueous slurry of lead carbonate.

Solution B is prepared by dissolving 91.9 parts of $Na_2Cr_2O_7.2H_2O$, 10.7 parts of $Na_2SO_4$, 2.46 parts of $NaHF_2$, 3.97 parts of concentrated $H_2SO_4$, 12.0 parts of the hydrated aluminum sulfate described in Example 1, and 20 parts of sodium silicate (0.2% by weight, based on the weight of the final base pigment) in 2910 parts of water at 80° F. (27° C.). The pH of the solution is adjusted to 1.85 with a 5% by weight aqueous solution of nitric acid.

To precipitate the pigment, Solution B is added to the previously prepared aqueous slurry of lead carbonate over a period of 40 seconds and the resulting slurry is stirred for five minutes. At intervals of 30 seconds the following solutions are added to the resulting slurry:

10.3 parts of $Na_2SO_4$ in 100 parts of water.
10.96 parts of $Na_2CO_3$ in 100 parts of water.
4.1 parts of $Na_4P_2O_7$ in 200 parts of water.

After addition of the above-described solutions, the slurry is heated to 180° F. (82° C.) and maintained at that temperature for 15 minutes.

Then at intervals of 30 seconds the following solutions are added to the slurry:

2.08 parts of $MnSO_4$ in 100 parts of water.
48.1 parts of the hydrated aluminum sulfate described in Example 1 in 100 parts of water.
5.20 parts of $Na_4P_2O_7$ in 250 parts of water.

The pH of the resulting slurry is adjusted to 5.0–5.1, after which the slurry is heated to 190° F. (88° C.) and maintained at that temperature for 20 minutes.

The resulting brilliant chrome yellow pigment of the primrose type is isolated and tested in the manner described in Example 1.

The color, lightfastness, and chemical resistance of this pigment are similar to those of a conventional primrose yellow pigment, prepared in an identical manner except for the omission of the sodium silicate in Solution B, i.e., in accordance with U.S. Pat. No. 3,370,971.

EXAMPLE 8

Dense Silica-Coated Chrome Yellow Pigment of the Primrose Type

The procedure of Example 2 is followed, except that 150 parts of the chrome yellow pigment of Example 7 is used.

The color and lightfastness of this dense silica-coated primrose yellow pigment are similar to those of a conventional dense silica-coated primrose yellow pigment prepared in an identical manner except for the omission of the sodium silicate in Solution B, i.e., in accordance with U.S. Pat. No. 3,370,971. The chemical resistance of this dense silica-coated primrose yellow pigment is superior to that of the conventional dense silica-coated primrose yellow pigment comparably tested. When tested for thermal stability in polystyrene as described in Example 2, this dense silica-coated pigment exhibited a degree of improvement in thermal stability relative to the conventional pigment comparable to the improvement specified in Example 2.

What is claimed is:

1. A dense silica-coated chromate pigment prepared by the steps of
    i. adding from 0.2% to 1% by weight of a soluble silicate compound, calculated as $SiO_2$ and based on the weight of the base lead chromate pigment, to an aqueous solution of a soluble salt of chromate and, optionally, at least one soluble salt selected from the group consisting of sulfate and molybdate,
    ii. contacting the aqueous solution of step (i) with an aqueous lead salt to precipitate the base lead chromate pigment,
    iii. treating the base lead chromate pigment with at least one hydrous metal oxide, and
    iv. applying a coating of dense, amorphous silica to the treated lead chromate pigment of step (iii) in an amount from 2% to 40% by weight, calculated as $SiO_2$ and based on the weight of the dense silica-coated lead chromate pigment.

2. A dense silica-coated lead chromate pigment according to claim 1 wherein the soluble silicate compound is added in an amount from 0.3% to 0.5% by weight, calculated as $SiO_2$ and based on the weight of the base lead chromate pigment.

3. A dense silica-coated lead chromate pigment according to claim 2 wherein the soluble silicate compound is an alkali metal silicate and the hydrous metal oxide is selected from the hydrous metal oxides of aluminum, titanium, manganese, silicon, tin, hafnium, thorium, columbium, tantalum, antimony, and bismuth.

4. A dense silica-coated lead chromate pigment according to claim 3 wherein the dense silica-coated lead chromate pigment exhibits improved thermal stability in plastic at temperatures from 175° C. to 375° C.

5. A dense silica-coated lead chromate pigment according to claim 4 wherein the plastic is selected from low density polyethylene, high density polyethylene, polypropylene, acrylonitrile butadiene styrene, flexible polyvinylchloride, rigid polyvinylchloride, polyphenylene oxide, ionomer resin, polycarbonate, polysulfone, nylon, polyacetal, cellulose acetate butyrate, and polystyrene.

* * * * *